United States Patent [19]

Yanagihara et al.

[11] 4,444,727

[45] Apr. 24, 1984

[54] HYDROGEN GAS PURIFICATION APPARATUS

[75] Inventors: Nobuyuki Yanagihara, Hirakata; Takaharu Gamo, Fujiidera; Yoshio Moriwaki, Hirakata; Tsutomu Iwaki, Yahata, all of Japan

[73] Assignee: Matsushita Electric Industrial Co. Ltd., Osaka, Japan

[21] Appl. No.: 390,626

[22] Filed: Jun. 21, 1982

Related U.S. Application Data

[63] Continuation of Ser. No. 215,384, Dec. 11, 1980, abandoned.

[30] Foreign Application Priority Data

Dec. 18, 1979 [JP] Japan .................. 54-165037

[51] Int. Cl.³ ............................................. B01J 23/90
[52] U.S. Cl. ................................. 422/223; 422/239; 55/68; 55/180; 55/208; 423/248; 423/648 R
[58] Field of Search ....................... 55/62, 68, 74, 387, 55/208, 179, 180; 423/248, 648 R; 422/208, 212, 223, 239

[56] References Cited

U.S. PATENT DOCUMENTS

| | | |
|---|---|---|
| 3,323,288 | 6/1967 | Cheung et al. |
| 3,516,263 | 6/1970 | Wiswall et al. |
| 3,734,293 | 5/1973 | Biskis |
| 3,922,872 | 12/1975 | Reilly et al. |
| 4,108,605 | 8/1978 | Billings |
| 4,178,987 | 12/1979 | Bowman et al. |
| 4,200,144 | 4/1980 | Sirovich |
| 4,211,537 | 7/1980 | Teitel |
| 4,215,008 | 7/1980 | Hagiwara et al. |

*Primary Examiner*—Bernard Nozick
*Attorney, Agent, or Firm*—Wenderoth, Lind & Ponack

[57] ABSTRACT

A hydrogen gas purification apparatus which includes at least one set of two hydrogen purification containers coupled to each other for heat exchanging therebetween, each of the hydrogen purification containers containing a hydrogen absorbing alloy. The hydrogen gas purification apparatus is so arranged as to cause hydrogen gas to be selectively desorbed from and absorbed into the hydrogen absorbing alloy by the amount of heat produced when the hydrogen gas is selectively absorbed into and desorbed from the hydrogen absorbing alloy.

7 Claims, 6 Drawing Figures

HYDROGEN GAS PURIFICATION APPARATUS

This application is a continuation of Ser. No. 215,384, filed Dec. 11, 1980 now abandoned.

BACKGROUND OF THE INVENTION

The present invention generally relates to a purification apparatus and more specifically, to a hydrogen gas purification apparatus utilizing hydrogen absorbing-desorbing alloys such as titanium-manganese alloy systems, etc.

Generally, hydrogen gas is important, for example, as a raw material, for industrial purposes, and is employed in a large quantity in various industries, for example, for synthesis of ammonia, methanol and the like or for purification of petroleum. Meanwhile, production of hydrogen gas which plays an important role in these modern industries is mainly effected by electrolysis of water, decomposition of ammonia, hydrocarbon (natural gas, petroleum, etc.), and methanol.

Hydrogen gas to be manufactured by the processes as described above generally contains inactive rare gases such as helium, krypton, argon and the like, inorganic group gases such as oxygen, nitrogen, carbon monoxide, carbon dioxide, ammonia, water, etc. and organic gases such as methane, ethane, etc. Accordingly, it becomes necessary to purify raw hydrogen gas according to end uses thereof.

At present, for the purification of raw hydrogen gas, there are commonly employed the absorption process, adsorption process, diffusion process, deep freeze separation process, chemical reaction process, etc., among which the adsorption process and diffusion process are particularly frequently employed as the methods capable of yielding hydrogen of high purity.

The adsorption process is the purification method of raw hydrogen gas most commonly employed today, and is arranged to remove impurities in the raw hydrogen gas by causing them to be adsorbed to zeolite group adsorbents, or adsorbents such as active carbon, alumina, silica gel and the like. The adsorption process is further classified into the pressure cycle system adsorption method, temperature cycle system adsorption method, and deep freeze adsorption method, etc. The pressure cycle system adsorption process is adapted to utilize a pressure cycle at normal temperature for effecting adsorption and desorption of impurities by the pressure difference. The temperature cycle system adsorption process utilizes a heating-cooling cycle for carrying out purification of raw hydrogen gas by the temperature difference. Meanwhile, in the deep freeze adsorption method, ultra-low temperature as in liquefied nitrogen (−196° C.) is utilized for purifying raw hydrogen gas by causing impurities to be adsorbed in the adsorbents.

On the other hand, the diffusion process utilizes a thin film layer of palladium-silver alloy so as to cause only hydrogen to diffuse and permeate therethrough for separation of hydrogen from impurities which can not pass through said thin film layer.

However, the conventional purification processes as described above have disadvantages as follows. In the first place, the adsorption process requires a cooling source such as liquefied nitrogen and the like, with complicated operations, thus resulting in high cost for hydrogen gas purification. Moreover, since removal of water content and carbon dioxide gas is essential as a preliminary treatment, the purification process is further complicated. Furthermore, in the known diffusion process as described earlier, not only is there some problem in the durability of the palladium-silver alloy layer, but the purification arrangement itself is comparatively expensive owing to the employment of such precious metals.

Meanwhile, there has been proposed, for example, in U.S. Pat. No. 3,516,263, a process for purification of hydrogen through utilization of metal hydrides, by which it is known that, since the alloy for absorbing hydrogen absorbs only hydrogen in hydrogen gas containing impurities, and desorbs only hydrogen, the hydrogen gas desorbed from the hydrogen absorbing alloy becomes much higher in purity than the hydrogen gas at the time of absorption. In this prior art hydrogen gas purification process employing the hydrogen absorbing alloy, absorption of hydrogen is effected through heat generation or exothermic reaction and desorption thereof is effected through heat absorption or endothermic reaction as is seen from the following reaction formula.

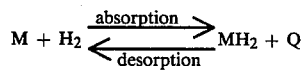

where M is alloy, $MH_2$ is hydride and Q is heat.

Therefore, the above known process, is arranged to take out hydrogen gas from a hydrogen storage container through heating for desorption of hydrogen, and cooling for absorption thereof. However, this prior art process requires separate heating and cooling sources, and when the heat source is not used, internal pressure is lowered due to the endothermic reaction during desorption of hydrogen, resulting in a reduction of flow rate, and thus, purified hydrogen gas can not be taken out continuously.

SUMMARY OF THE INVENTION

Accordingly, an essential object of the present invention is to provide an improved hydrogen gas purification apparatus in which particular attention is directed to the amounts of heat generation during the absorption of hydrogen and heat absorption during the desorption of hydrogen which are brought about by the properties of a hydrogen absorbing alloy, for mutual utilization of such heat amounts.

Another important object of the present invention is to provide an improved hydrogen gas purification apparatus of the above described type in which at least one set of hydrogen purification containers containing therein hydrogen absorbing alloy are connected to each other for heat exchanging through a heat exchanger so that hydrogen gas to be purified is caused to be absorbed into the hydrogen absorbing alloy contained in one of said hydrogen purification containers, while hydrogen absorbed in the hydrogen absorbing alloy is desorbed from the other of said containers in the form of purified hydrogen gas.

A further object of the present invention is to provide an improved hydrogen gas purification apparatus of the above described type in which the hydrogen purification containers are coupled to each other through a heat storage container for heat exchanging therebetween, while the heat generated when hydrogen is caused to be absorbed in one of said hydrogen purification containers, is stored in the heat storage container for desorbing hydrogen absorbed in the alloy from said container or the other of the containers in the form of purified hydrogen.

A still further object of the present invention is to provide an improved hydrogen gas purification apparatus of the above described type which is highly efficient in operation and simple in construction, and can be readily manufactured at low cost.

In accomplishing these and other objects, according to one preferred embodiment of the present invention, there is provided a hydrogen gas purification apparatus which includes at least one set of two hydrogen purification containers coupled to each other for heat exchanging and hydrogen absorbing alloy incorporated in each of the hydrogen purification containers containing a hydrogen absorbing alloy. The hydrogen gas purification apparatus is so arranged as to cause hydrogen gas to be selectively desorbed from and absorbed into the hydrogen absorbing alloy by heat produced when hydrogen gas is selectively absorbed into and desorbed from the hydrogen absorbing alloy.

By the arrangement according to the present invention as described above, an improved hydrogen purification apparatus has been advantageously presented in which hydrogen gas of high purity may be continuously or intermittently obtained very efficiently, with substantial elimination of disadvantages inherent in the conventional hydrogen purification apparatuses of this kind.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout the accompanying drawings.

DETAILED DESCRIPTION OF THE INVENTION

Figure 1:
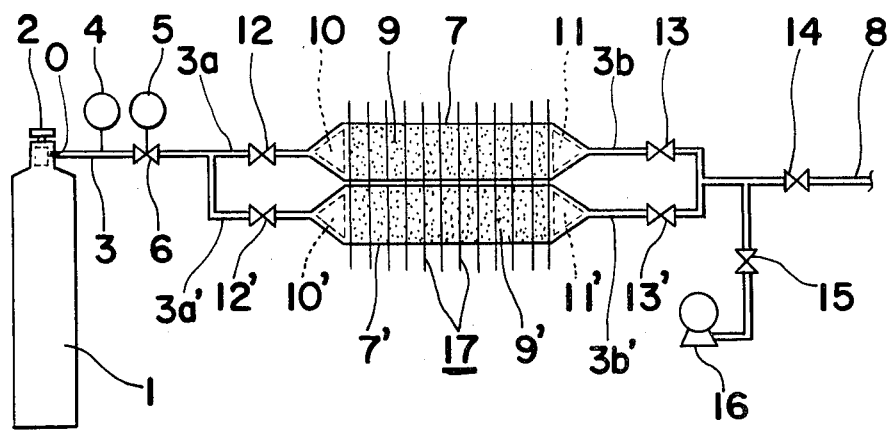
FIG. 1 is a schematic side elevational view of a hydrogen gas purification arrangement according to one preferred embodiment of the present invention.
Figure 2:
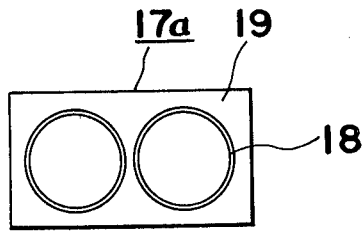
FIG. 2 is a top plan view of a heat exchanging member for a heat exchanger employed in the apparatus of FIG. 1.
Figure 3:
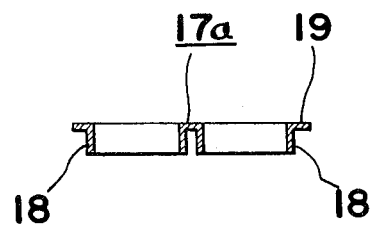
FIG. 3 is a side sectional view of the heat exchanging member of FIG. 2.

Referring now to the drawings, there is shown in FIG. 1 a hydrogen gas purification apparatus according to one preferred embodiment of the present invention, which generally includes a hydrogen storage container 1 in which industrial compressed hydrogen is filled and whose upper opening O is connected, through an on/off plug 2, to one end of a hydrogen supply pipe 3 equipped with a primary gauge 4, a secondary gauge 5 and a valve 6, and hydrogen purification containers 7 and 7' which are connected, at the hydrogen gas inlet sides thereof equipped with valves 12 and 12', to the other end of the supply pipe 3 through corresponding parallel gas passages 3a and 3a'. The hydrogen purification containers 7 and 7' are further connected, at the hydrogen gas outlet sides thereof equipped with valves 13 and 13', to one end of a purified hydrogen gas supply pipe 8 having a valve 14 through corresponding parallel gas passages 3b and 3b'. More specifically, the hydrogen purification containers 7 and 7' contain therein hydrogen absorbing alloy 9 and 9', and are provided with filters 10 and 10', and 11 and 11' respectively incorporated in the hydrogen gas inlet sides and outlet sides thereof as shown. The purified hydrogen gas supply pipe 8 is connected, at the upstream side of the valve 14, to a vacuum pump 16 through a valve 15. The hydrogen gas purification apparatus of FIG. 1 further comprises a heat exchanger 17 having a number of heat exchanging members or fin type heat conducting plates 17a connecting the hydrogen purification containers 7 and 7' to each other for heat exchanging therebetween, and each including cylindrical portions 18 closely contacting the outer periphery of the containers 7 and 7' and a fin portion 19 integrally formed with or rigidly connected to said cylindrical portions 18 as shown in FIGS. 2 and 3.

It is to be noted here that the fin type heat exchanger 17 as described above should preferably be made of aluminum, copper or the like for efficient heat exchanging, while for the filters 10 and 10', and 11 and 11' incorporated in the hydrogen purification containers 7 and 7', it is desirable to employ a metallic sintered material or metallic porous material having a pore diameter of 0.1 to several $\mu$m which does not allow alloy particles, but allows only hydrogen, to pass therethrough.

By the above arrangement in FIG. 1, for operation, after introducing hydrogen gas into the hydrogen supply pipe 3, the vacuum pump 16 is actuated for removal of air within the hydrogen purification containers 7 and 7' and pipings, and thereafter, the valves 13 and 13', and 15 are closed, with the valves 12 and 12' and 14 also kept closed. In the above state, upon opening of the on/off plug 2 of the hydrogen storage container 1, the primary pressure of hydrogen gas is shown by the primary gauge 4. Subsequently, the secondary pressure is adjusted by the valve 6. Upon opening of the valve 12 in the above state, hydrogen gas is absorbed by the hydrogen absorbing alloy 9 through the filter 10 provided in the hydrogen purification container 7. When the hydrogen gas reaches a state of saturation, the valve 12 is closed, and the valve 12' opened, with simultaneous opening of the valves 13 and 14, whereby the hydrogen gas absorbed in the alloy 9 flows in the purified gas supply pipe 8 through the filter 11 in the container 7, while simultaneously, the hydrogen gas in the storage container 1 is absorbed by the hydrogen absorbing alloy 9' through the filter 10' provided in the container 7'. In the above state, desorption and absorption of hydrogen gas is to be effected simultaneously.

As described earlier, since the absorption of hydrogen gas is an exothermic reaction, while desorption thereof is an exothermic reaction, the endothermic heat due to absorption of hydrogen gas into the hydrogen absorbing alloy 9' is utilized for desorption of hydrogen from the hydrogen absorbing alloy 9. For efficiently carrying out the heat transfer as described above, the fin type heat exchanger 17 is coupled to both of the containers 7 and 7'.

Upon completion of the desorption of hydrogen gas from the hydrogen absorbing alloy 9, the valves 12' and 13 are closed, with the valves 12 and 13' opened, whereby hydrogen gas in the storage container 1 flows into the hydrogen purification container 7, and at the same time, the hydrogen gas starts to be desorbed from the container 7'.

Figure 4:
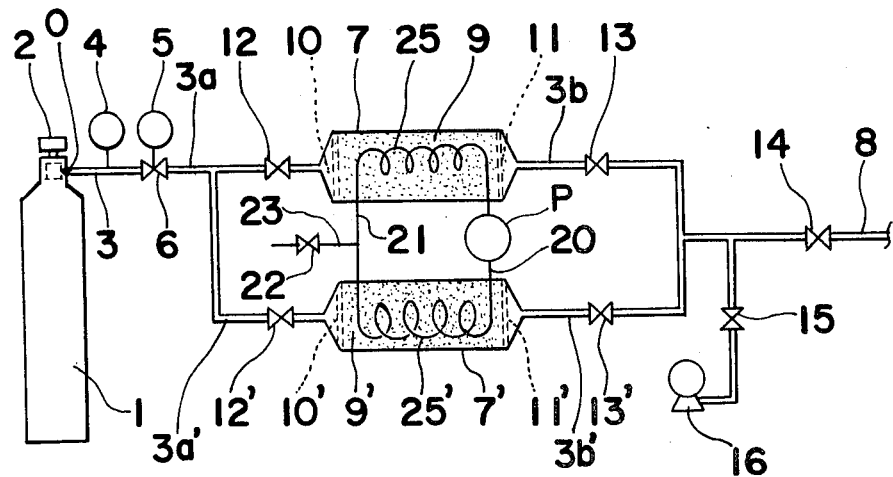
FIG. 4 is a view similar to FIG. 1, which particularly shows a modification thereof.

Referring to FIG. 4, there is shown a modification of the hydrogen gas purification apparatus of FIG. 1. In this modification, the hydrogen purification containers 7 and 7' are coupled to each other for heat exchanging by a moving heating medium, as compared with the arrangement of FIG. 1 in which the set of hydrogen purification containers 7 and 7' are coupled to each other by the fin type heat conducting plates 17a. More specifically, in the arrangement of FIG. 4, the fin type heat exchanger 17 described as employed in the arrangement of FIG. 1 is replaced by a heating medium pipe 21, which is coupled to heat exchanging portions 25 and 25' respectively provided in the containers 7 and 7' and connected to each other through a pipe 20 provided with a pump P, with a heating medium injection passage 23 having a valve 22 being connected to the heating medium pipe 21.

Since other constructions and operations of the modification of FIG. 4 are similar to those in the arrangement of FIG. 1 except for adding an operation for circulating the heating medium by driving the pump P, further, detailed description thereof is unnecessary.

Figure 5:
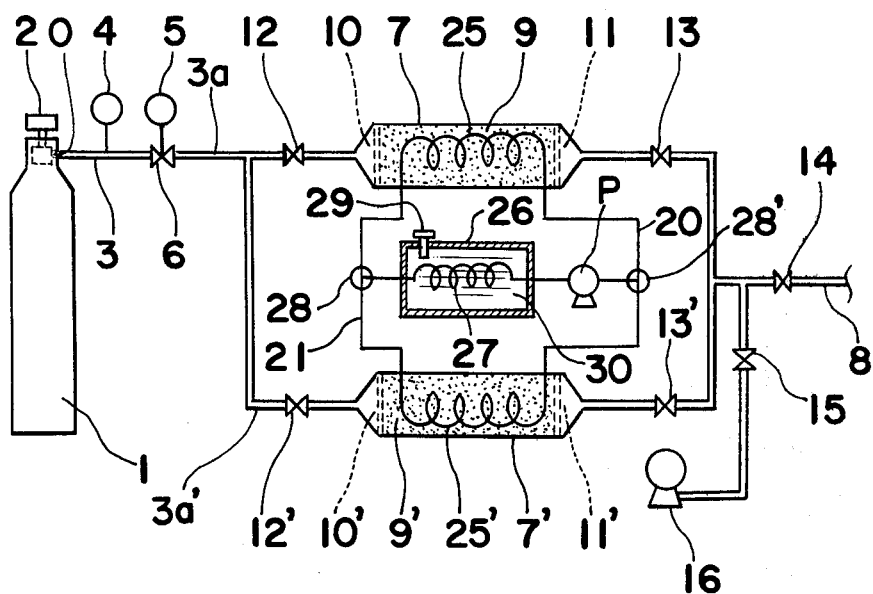
FIGS. 5 and 6 are views similar to FIG. 1, which particularly show further modifications employing heat storage containers.
Figure 6:
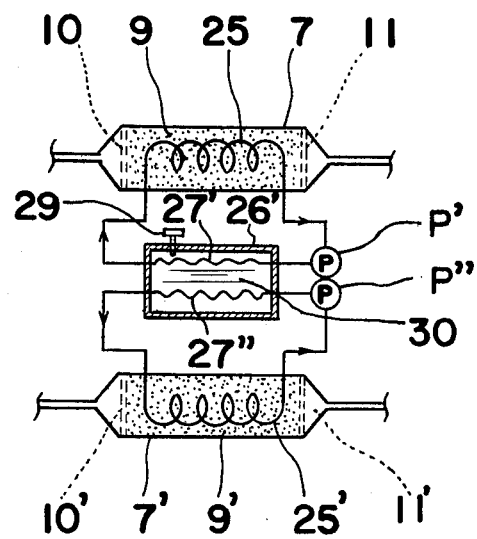

Reference is made to FIGS. 5 and 6 showing further modifications of the arrangement of FIG. 4 in which a heat storage container 26 is further provided so as to accumulate therein heat to be generated when hydrogen is absorbed in the alloy, and utilize the accumulated heat in the desorption of hydrogen.

In the modification of FIG. 5, the heat storage container 26 having a heat exchanger 27 and a heat-absorbing medium 30 incorporated therein, and a liquid injection plug 29, is added to the arrangement of FIG. 4, while one end of the heat exchanger 27 is connected to the heating medium pipe 21 through a three-way valve 28, with the other end thereof being connected to the pipe 20 connecting the heat exchangers 25 and 25' through the pump P and another three-way valve 28'.

In the above arrangement of FIG. 5, heat to be generated when hydrogen is absorbed into the alloy 9 in the container 7 is not immediately utilized for desorption of hydrogen, but is accumulated in the heat storage container 26 through the heat exchangers 25 and 27, while the heating medium is being circulated by driving the pump P. Subsequently, by changing over the three-way valves 28 and 28' to the side of the container 7' for heat dissipation from the heat-absorbing medium 30 through the heat exchanger 25' hydrogen is desorbed from the alloy 9' in the container 7' in the form of purified hydrogen. Alternatively, it may be so arranged that, without changing over the three-way valves 28 and 28', the heat-absorbing medium 30 is caused to dissipate heat into the same container for desorption of hydrogen therefrom.

Meanwhile, in the modification of FIG. 6, the heat storage container 26 in the arrangement of FIG. 5 is replaced by a heat storage container 26' having heat exchangers 27' and 27" and the heat-absorbing medium 30 provided therein. One end of the heat exchanger 27' is connected to the corresponding end of the heat exchanger 25 in the container 7, with the other end of said heat exchanger 25 being connected to the corresponding other end of the heat exchanger 27' through a pump P', while one end of the heat exchanger 27" is coupled to the corresponding end of the heat exchanger 25' in the container 7', with the other end of the heat exchanger 27" being connected to the corresponding other end of said heat exchanger 25' through a pump P", thus providing two circulating paths of the heating medium 30 through the heat storage container 26'.

By the modification of FIG. 6, in the similar manner as in the arrangement of FIG. 5, it is possible to accumulate, in the heat storage container 26', the heat produced during absorption of hydrogen into the alloy for utilizing said heat simultaneously or at proper intervals as a heat source during desorption of hydrogen. More specifically, when the pump P' and P" for circulating the heating medium are simultaneously operated, the heat during absorption of hydrogen can be used for hydrogen desorption at the same time through the heat absorbing medium 30. Meanwhile, with the operating periods for the pumps P' and P" being deviated, the accumulated heat may be utilized for hydrogen desorption. On the other hand, based on the same principle, it is possible to store the desorbing heat of hydrogen for utilization thereof during absorption of hydrogen. Apart from the case where hydrogen is continuously taken out, even in the case where hydrogen is intermittently taken out, effective purification of hydrogen is possible through utilization of heat accumulated in the heat storage container.

As is seen from the foregoing description, by arranging at least one set of the hydrogen purification containers to be coupled to each other for heat-exchanging therebetween for simultaneous or intermittent and alternate absorption and desorption of hydrogen gas so as to utilize the hydrogen absorbing heat in one of the containers for hydrogen desorption from the other container, it is possible to efficiently produce purified hydrogen gas continuously or intermittently.

Hereinbelow, EXAMPLES are inserted for the purpose of illustrating the hydrogen purification effects of the arrangements according to the present invention, without any intention of limiting the scope thereof.

EXAMPLE 1

For one example of a hydrogen absorbing alloy, $TiMn_{1.5}$ alloy was employed. More specifically, commercially available titanium (higher than 99.5% in purity) and manganese (higher than 99.5% in purity) were weighed to constitute the composition of $TiMn_{1.5}$ alloy which was ground into particle diameter of approximately 10 to 50 mesh after having been heated for melting in a melting furnace. 6.5 kg of the above alloy particles were accommodated in cylindrical containers as the hydrogen purification containers each having a diameter of 63 mm, length of 500 mm and internal volume of about 2 l. Since the effective hydrogen amount that can be absorbed by $TiMn_{1.5}$ alloy is 0.8 l/g, the overall effective hydrogen amount of the entire alloy is 1.17 m$^3$. Additionally, by taking into account the expansion of the alloy due to absorption of hydrogen, the voids in the interior of the container were set to be approximately 50%. For the hydrogen purification, the arrangement as shown in FIG. 1 was employed in which the hydrogen purification containers 7 and 7' were coupled to each other by the heat exchanger 17 having aluminum fin type heat exchanging plates.

EXAMPLE 2

With other conditions generally similar to those in EXAMPLE 1, the hydrogen purification arrangement was replaced by the one as shown in FIG. 4 in which wound pipes 25 and 25' of copper material respectively provided in the containers 7 and 7' for the heat exchanging portions were connected to each other through the pump P for the heat exchanging during circulation of the heating medium. In this EXAMPLE, water was employed as the heating medium, with the circulating amount thereof set to be approximately 5 l/min.

EXAMPLE 3

With other conditions generally the same as those in EXAMPLE 2, the hydrogen purification arrangement was replaced by the one as shown in FIG. 5, in which wound pipes 25 and 25' of copper material respectively provided in the containers 7 and 7' for the heat exchanging portions were connected in parallel with each other through the heat storage container 26 for the heat exchanging of heat accumulated in the heat storage container during circulation of the heating medium by the pump P.

EXAMPLE 4

With other conditions generally the same as those in EXAMPLE 3, the hydrogen purification arrangement was replaced by the one as shown in FIG. 6, in which wound pipes 25 and 25' of copper material respectively provided in the containers 7 and 7' for the heat exchanging portions were separately connected to each other through the heat storage container 26' for respectively heat exchanging the heat accumulated in the heat storage container 26' during circulation of the heating medium through the respective containers by the two pumps P' and P''.

According to the EXAMPLES as described in the foregoing, the desorption amount and purity of the hydrogen were investigated. In the first place, comparative experiments were carried out between the conventional arrangement in which the hydrogen purification containers were not connected to each other for heat exchange and the arrangements of the present invention employed in the above EXAMPLES 1, 2, 3 and 4, the results of which are shown in Table 1 below.

approximately 6 hours for desorbing 90% of the total hydrogen storage amount of 1.17 m$^3$.

On the contrary, in the case where the hydrogen absorbing heat is utilized directly or indirectly by once accumulating the heat in the heat storage container for desorption of hydrogen through heat exchange as in EXAMPLES 1, 2, 3 and 4 according to the present invention, the hydrogen desorption amount was maintained at approximately 10 l/min. for more than about one hour, with less reduction of the hydrogen desorption pressure than in the conventional arrangement, and in the latter half of the experiments, 90% of the total hydrogen storage amount was desorbed in about 2.5 and 3.0 hours at the average flow rate of about 4 l/min. Therefore, according to the present invention, it has been made possible to desorb hydrogen in a period of time approximately ½ that in the conventional arrangement.

Meanwhile, the hydrogen effective utilization rates at the flow rates of approximately 10 l/min. and 4 l/min. were respectively at about 55 to 60% and 80 to 90% in the present invention as compared to the utilization rates of about 30% and 45% in the conventional arrangement, thus showing improvements by approximately two times as compared with the conventional arrangement. Since the hydrogen desorption speed is closely related to the efficiency of the heat exchange, it is necessary to cause the heat exchange to mutually take place smoothly in the case where the flow rate is large, but the heat exchange does not necessarily proceed efficiently, even if the efficient heat exchange is taken into consideration. Even in the arrangement of the present invention, superior to the conventional arrangement as described in the foregoing, in the case where the flow rate is large, the hydrogen desorption pressure is still decreased, thus making it rather difficult to desorb hydrogen efficiently. In such a case, it is arranged to desorb hydrogen by increasing the pressure through reduction of the flow rate. Therefore, the smaller the flow rate, the higher is the effective utilization rate of hydrogen.

TABLE 1

Comparisons of hydrogen purification arrangements

|  | *[1]Time required for hydrogen amount (90%) | *[2]Effective hydrogen utilization rate at flow rate of 10 l/min. | *[2]Effective hydrogen utilization rate at flow rate of 4 l/min. |
| --- | --- | --- | --- |
| Conventional type | Approx. 6 hrs. | 30% | 45% |
| EXAMPLE 1 | Approx. 2.5 hrs. | 60% | 90% |
| EXAMPLE 2 | Approx. 2.5 hrs. | 60% | 90% |
| EXAMPLE 3 | Approx. 3.0 hrs. | 55% | 80% |
| EXAMPLE 4 | Approx. 3.0 hrs. | 55% | 80% |

Remarks:
*[1]Desorption speed (flow rate) of hydrogen was initially set to be approximately at 10 l/min., and thereafter, gradually decreased for the comparison of time required for desorbing hydrogen by about 90% with respect to the total storage amount.
*[2]With respect to the desorption speeds (flow rates) of hydrogen at about 10 l/min. and 4 l/min. respectively, hydrogen is initially desorbed at the above flow rates, but if the heat exchange is insufficient with respect to the falling internal temperature, the hydrogen desorption pressure is lowered (to less than one atmosphere) and the hydrogen desorption amount is extremely reduced. The hydrogen desorption amount with respect to the total hydrogen storage amount in the above state was shown as the effective utilization rate of hydrogen.

In the above comparative experiments, it was found that, in the conventional arrangement, upon desorption of hydrogen at the flow rate of approximately 10 l/min., the hydrogen desorption pressure was lowered to about ½ within less than 30 minutes from the starting, with the flow rate being unable to be maintained at 10 l/min., and thus, the flow rate was gradually lowered requiring As is seen from the foregoing description, according to the present invention in which the amount of hydrogen that can be taken out is large, with a short time required for the hydrogen desorption, it is possible to obtain purified hydrogen gas intermittently or continuously without using another heat source in the case where a comparatively large amount of highly purified hydrogen gas is required. For the heating medium and heat storage medium to be employed in the present invention, harmless, inexpensive solvent mediums easy to use such as water, ethylene glycol or mixtures thereof, etc. are best suited.

Furthermore, Ti-Mn alloy systems to be employed in the present invention have features as follows. The amount of heat of $TiMn_{1.5}$ alloy is 7.0 kcal per one mol of the absorbed hydrogen, and since hydrogen of one mol is desorbed or absorbed per one mol of the alloy (130 g), a heat amount of 7 kcal is produced. Accordingly, the total heat amount when the 6.5 kg of alloy is employed will be 350 kcal. During desorption of hydrogen, the temperature of the alloy particles themselves are lowered through endothermic reaction, with reduction of the desorption flow rate of hydrogen. On the contrary, since the exothermic reaction takes place in the absorption of hydrogen, the lowering of temperature of the alloy particles themselves during the desorption is prevented for desorption at approximately constant temperature (ambient temperature), if the above heat amount is utilized.

Moreover, hydrogen absorbed in the hydrogen absorbing alloys is highly purified. More specifically, the hydrogen absorbing alloys, especially Ti-Mn binary alloys mainly composed of $TiMn_{1.5}$, ternary and quarternary alloys composed of elements such as Ti, Mn, Zr, Cr, etc., and Ti-Mn multi-component alloy systems such as five-component alloys composed of Ti, Mn, Zr, Cr, V, etc. are very active as compared with other hydrogen absorbing alloys. The alloys as described above are readily ground into fine particles, with extremely increased surface area, and therefore, easily absorb hydrogen, but on the contrary, have such properties that other gases are readily absorbed into or react with the fine particles of the alloys. Accordingly, since only hydrogen gas is desorbed from the alloys, highly purified hydrogen gas can be obtained. In the above case, the purity of hydrogen gas passed through the hydrogen purification apparatus according to the present invention has been improved by one to two digits in its value when TiMn group alloy was employed. More specifically, a purity of 99.9% of hydrogen gas for industrial purpose (standard item) has been improved up to 99.99 to 99.999%. Although the purity improvement was possible by other hydrogen absorbing alloys, a remarkable effect was obtained especially when Ti-Mn alloy systems were employed. The above fact means that the alloys as described above are active.

Besides TiMn alloys, TiFe alloys, $LaNi_5$ alloys, $MmNi_5$ alloys, etc. may be similarly utilized.

In connection with the above, hydrogen absorbing alloys having a hydrogen desorption pressure of 1 to 20 atmospheres at normal temperatures are preferable, since, at a hydrogen desorption pressure lower than 1 atmosphere, external heating means is required, while at a hydrogen desorption pressure higher than 20 atmospheres, more than 40 atmospheres are required for the absorption of hydrogen.

It should be noted here that, in the foregoing embodiments, although the present invention has been described with reference to the case wherein the heat exchanger is employed, the present invention is not limited in its application to such a case alone, but may readily be applicable to other heat transfer arrangements in which, for example, both of the hydrogen purification containers are placed in the heating medium for the heat exchanging therebetween, and thus, in the present invention, the basic principle is in short to mutually utilize the heat amount during the desorption and absorption of hydrogen.

It should also be noted that, in the foregoing embodiments, there are described the arrangements in which one set of the two hydrogen gas purification containers is employed, but such arrangements may further be modified, for example, in such a manner that a plurality of sets of the hydrogen purification containers are connected in series for higher purity of hydrogen gas, or connected in parallel for increasing the desorption amount of hydrogen.

It should further be noted that, although the present invention has been described with reference to the hydrogen purification arrangements in the foregoing embodiments, the arrangements may be used for a hydrogen storage arrangement which mutually utilizes the heat amount produced during the absorption or desorption of hydrogen.

As is clear from the foregoing description, according to the present invention, hydrogen gas of high purity can be continuously or intermittently obtained at high efficiency, while hydrogen may be efficiently stored, with the desorption thereof being comparatively facilitated, thus contributing to the earlier mentioned industries to a large extent.

Although the present invention has been fully described by way of examples with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A hydrogen gas purification apparatus which consists of:
    at least one set of two hydrogen purification containers each including a heat exchanger coupled to each other through heat exchanging means for transferring only heat produced during hydrogen absorption in one of said containers to the other of said containers, each of said hydrogen purification containers containing a hydrogen absorbing alloy, said heat exchanging means comprising a heat storage container means for storing heat during the selective hydrogen absorption and desorption for causing the selective desorption and absorption of hydrogen gas to take place through heat exchanging of said stored heat,
    inlet means for introducing hydrogen gas to be purified into each of said containers, and
    outlet means for withdrawing purified hydrogen gas from each of said containers,
    said hydrogen gas purification containers being so arranged so as to cause hydrogen gas to be desorbed from the hydrogen absorbing alloy only by heat produced when hydrogen gas is absorbed into said hydrogen absorbing alloy.

2. A hydrogen gas purification apparatus as claimed in claim 1, wherein one of said two hydrogen purification containers is arranged to absorb hydrogen gas thereinto, and the other of said two hydrogen purification containers is arranged to desorb hydrogen gas therefrom.

3. A hydrogen gas purification apparatus as claimed in claim 1, wherein said hydrogen absorbing alloy is an alloy which desorbs hydrogen under a pressure of 1 to 20 atmospheres at normal temperature.

4. A hydrogen gas purification apparatus as claimed in claim 1, wherein said hydrogen absorbing alloy is an alloy selected from the group consisting of Ti-Mn binary alloy, Ti-Mn ternary alloy, Ti-Mn quaternary alloy, and a five or more-component alloy containing at least Ti and Mn.

5. A hydrogen gas purification apparatus as claimed in claim 1, wherein said heat exchanging means further comprises a heating medium to be circulated through said hydrogen purification containers by pumping means.

6. A hydrogen gas purification apparatus as claimed in claim 5, wherein said heating medium is selected from the group consisting of water, an organic solvent and a mixture thereof.

7. A hydrogen gas purification apparatus as claimed in claim 6, wherein said organic solvent is selected from the group consisting of ethylene glycol and silicone oil.

* * * * *